May 26, 1953  F. E. MUNSCHAUER  2,639,795
FLUID OPERATED CLUTCH
Filed Aug. 25, 1950
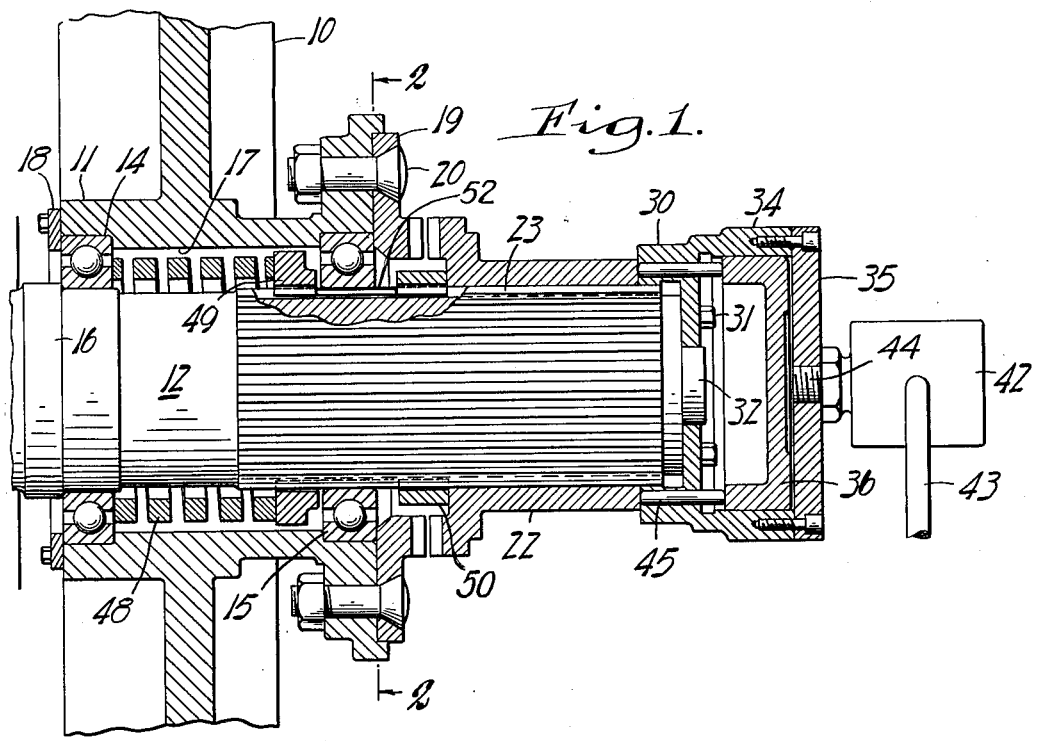
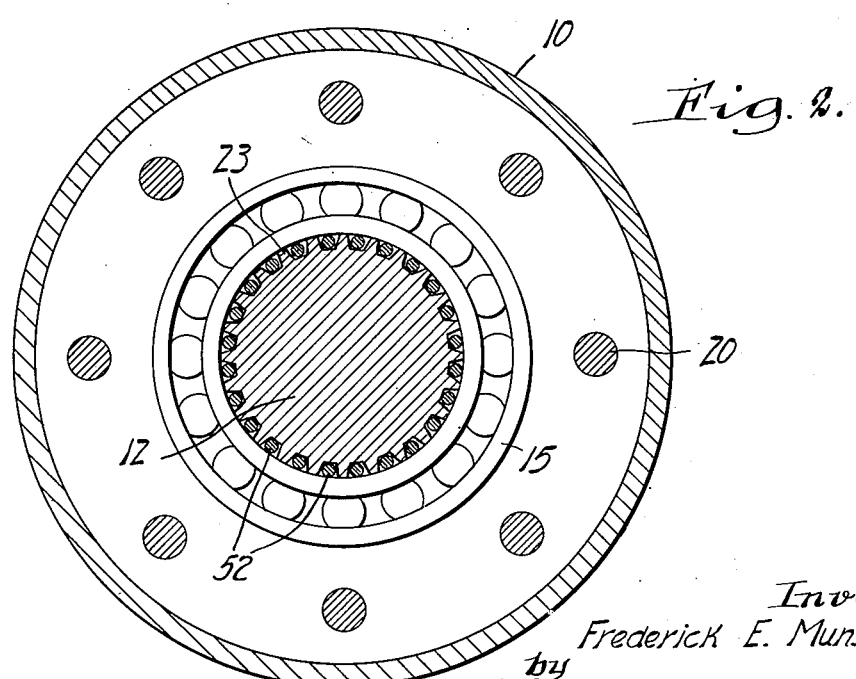
Inventor
Frederick E. Munschauer
by
Bean, Brooks, Buckley & Bean
Attorneys Patented May 26, 1953

2,639,795

UNITED STATES PATENT OFFICE 2,639,795

FLUID OPERATED CLUTCH

Frederick E. Munschauer, Buffalo, N. Y., assignor to Niagara Machine & Tool Works, Buffalo, N. Y.

Application August 25, 1950, Serial No. 181,477

4 Claims. (Cl. 192—67)

This invention relates to drive means for machinery and particularly to a novel clutch arrangement for connecting and disconnecting the driving and driven portions in power driven machines.

The clutch arrangement of the present invention is particularly advantageous in driving such machines as punch presses, power shears, and the like, where relatively high work output subjects the clutch to very considerable loads. However, the teachings and principles of the invention may be applied wherever the inherent advantages thereof may prove desirable. In presses, shears, and the like the provision of positive drive means is generally desirable and, fundamentally, the present invention provides a novel arrangement of the parts in a positive jaw clutch drive means which is controlled by fluid pressure acting in opposition to spring means.

Provision of a clutch mechanism of the kind thus generally set forth has previously been proposed, but in the present invention the parts are so arranged as to provide a simpler and more compact design arrangement without sacrificing mechanical strength and efficiency. Specifically, the coil spring which is commonly employed to bias the clutch parts to a normally disconnected position is arranged to be located between axially spaced anti-friction bearings which mount the flywheel or other driving wheel of the machine with the result that the diameter of the jaw portions of the clutch parts may be reduced considerably and the necessary axial extent of the clutch mechanism is greatly reduced.

The latter factor is of especial importance where the clutch mechanism is mounted at one end of a drive shaft since it greatly reduces the overhang due to the presence of the clutch mechanism.

While general reference is made herein to fluid pressure operation, the usual source of fluid energy is compressed air. The present clutch mechanism is simpler in construction than those of the prior art, and the arrangement is such that the action of the compressed air against the piston which engages the clutch is direct and immediate and, therefore, makes for faster clutch engagement and, in, fact, also quicker disengagement.

According to the present invention, all parts of the clutch mechanism, excepting the flywheel, are stationary, excepting when the flywheel or other drive wheel and the drive shaft are clutched for joint rotation. Further, when the clutch is disengaged the reaction of the compression coil spring which urges the clutch to disengaged position is borne by parts that remain stationary with the drive shaft. Since the clutch is usually disengaged for the major part of the time when the flywheel is running, this is a material factor.

A single embodiment of the principles of the present invention is illustrated in the accompanying drawing and described in detail in the following specification. This embodiment is by way of example only and the present invention is not limited to that form or otherwise excepting as defined in the appended claims.

In the drawing:

Fig. 1 is a longitudinal fragmentary central cross-sectional view through one form of the device of the present invention; and Fig. 2 is a transverse cross-sectional view on the line 2—2 of Fig. 1.

Like characters of reference denote like parts and the numeral 10 designates a flywheel, gear or other driving wheel element having a hub 11. Numeral 12 designates one end portion of a drive shaft which may comprise the crank shaft of a power press or similar machine wherein the shaft is to be intermittently or selectively rotated by connection with the flywheel or other driving wheel 10. While shaft 12 may comprise the crank shaft or eccentric shaft of a punch press, power shear, or like machine, it may be an intermediate shaft having further driving connection with the ultimate driven shaft of the machine.

A pair of anti-friction bearings 14 and 15 support flywheel 10, the inner race of bearing 14 being in abutment with an enlargement 16 on shaft 12. The flywheel 10 is provided with an axial bore 17 of substantially greater diameter than the adjacent portion of drive shaft 12 and the outer race of bearing 14 is retained in an end enlargement of bore 17 by a retaining ring 18. A jaw clutch element 19 is fixed to flywheel 10 and, in the illustrated instance, the flywheel is recessed to receive the clutch element, the latter being secured by means of bolts 20.

A movable clutch element 22 of sleeve form has spline connection with shaft 12 as at 23, whereby it is fixed against rotation relative to shaft 12 but is axially movable thereon. The end of bore 17 which is adjacent to clutch element 19 is likewise enlarged to provide a recess for receiving the outer race of bearing 15, and this outer race is clamped securely in such recess by clutch element 19.

In the form of the present invention illustrated herein, an adaptor 30 which supports the entire fluid pressure clutch engaging mechanism is secured to the end of shaft 12 by means of screws 31, the shaft 12 having a reduced end portion 32 engaging in a complementary recess in adaptor 30 to accurately locate the same. Adaptor 30 is provided with a cylindrical casing portion 34 and a head or cover plate 35 is screwed to the outer end of cylindrical portion 34 to provide an operating chamber for a piston 36. Cover plate 35 is provided centrally thereof with a rotary fluid connector 42.

The body of connector 42 remains stationary, and is connected with a relatively stationary pressure supply pipe 43, while an outlet stem portion 44 is screwed into cover plate 35 and is freely rotatable relative to the body 42 of the connector. The interior details of the connector need not be illustrated or described since these devices are freely available commercially. The supply pipe 43 will, of course, be provided with conventional control valve means which may be selectively manipulated at the will of the operator to apply or not apply air pressure to cylinder 34.

A circularly arranged series of pins 45 is mounted in adaptor 30 for free axial sliding movement and bear at their opposite ends against the end of the skirt of piston 36 and against the adjacent end of slidable clutch element 22. Clutch element 22 is normally held in the disengaged position illustrated in Fig. 1 by a compression coil spring 48 which bears at one end against the inner race of anti-friction bearing 14.

The other end of spring 48 bears against a collar 49 which is internally splined to engage the spline formation 23 of shaft 12 and is freely slidable therealong. A second internally splined collar 50 is disposed against the face of slidable clutch element 22 which is toward the fixed clutch element 19 and in effect forms a continuation of the splined bearing portion of clutch element 22.

A series of pins 52 are disposed in the grooves of spline formation 23 between the collars 49 and 50 and are of such length that they bear at their opposite ends against the teeth of the internal spline formations of the collars 49 and 50. It will thus be seen that the force of spring 48 is directed freely against axial movable clutch element 22, the force of the spring being so transmitted that it is uniformly distributed circumferentially of the collars 49 and 50. The diameters of the pins 52 are such that they slide freely in the grooves of spline formations 23 and within the inner race of anti-friction bearing 15 without interference.

It will thus be seen that spring 48 accomplishes its purpose in a simple and direct manner while it is accommodated in a space between the anti-friction bearings 14 and 15 which would otherwise be wasted, and the mechanical efficiency and economy of the resultant design is obvious.

What is claimed is:

1. Drive means for power presses, shears and like machines comprising a drive shaft, a normally rotating drive wheel, a pair of axially spaced anti-friction bearings mounting said wheel on said shaft for independent rotation, a jaw clutch element fixed against a face of said wheel, an axially slidable complementary jaw clutch element having internal spline formations and interfitting external spline formations on said drive shaft, the drive shaft spline formations extending axially to a point between said anti-friction bearings, an axially slidable internally splined collar engaging the drive shaft spline formations between said anti-friction bearings, a compression coil spring seating at one end against the inner race of the anti-friction bearing which is remote from the jaw clutch elements and at its other end against said collar, a circumferential series of pins disposed between adjacent splines of said drive shaft spline formation and extending between said collar and the axially slidable jaw clutch element whereby the coil spring normally urges the latter to disengaged position, and means for selectively engaging the clutch elements against the resistance of said coil spring.

2. Drive means for power presses, shears and like machines comprising a drive shaft, a normally rotating drive wheel, a pair of axially spaced bearing portions mounting said wheel on said shaft for independent rotation, a clutch element fixed with respect to said wheel, an axially slidable complementary clutch element having internal spline formations and interfitting external spline formations on said drive shaft, the drive shaft spline formations extending axially to a point between said bearing portions, an axially slidable internally splined collar engaging the drive shaft spline formations between said bearing portions, a compression coil spring seating at one end against the bearing portion which is remote from the clutch elements and at its other end against said collar, a circumferential series of pins disposed between adjacent splines of said drive shaft spline formation and extending between said collar and the axially slidable clutch element whereby the coil spring normally urges the latter to disengaged position, and means for selectively engaging the clutch elements against the resistance of said coil spring.

3. Drive means for power presses, shears and like machines comprising a drive shaft, clutch means rotatably mounted thereon by means of axially spaced bearing portions, an axially slidable clutch element and interfitting spline formations on said shaft and said slidable clutch element, the drive shaft spline formations extending axially to a point between said bearing portions, an axially slidable internally splined collar engaging the drive shaft spline formations between said bearing portions, force means between said bearing portions acting against said collar to urge the same toward the slidable clutch element, and a circumferential series of pins disposed between adjacent splines of said drive shaft spline formation and extending between said collar and said slidable clutch element whereby said force means normally urges the latter to disengaged position.

4. Drive means for power presses, shears and like machines comprising a drive shaft, clutch means rotatably mounted thereon by means of axially spaced bearing portions, an axially slidable clutch element and interfitting spline formations on said shaft and said slidable clutch element, the drive shaft spline formations extending axially to a point between said bearing portions, an axially slidable internally splined collar engaging the drive shaft spline formation between said bearing portions, force means between said bearing portions acting against said collar to urge the same toward the slidable clutch element, and a circumferential series of pins disposed between adjacent splines of said drive shaft spline formation and extending between said collar and said slidable clutch element whereby said force means normally urges the latter to disengaged position, and other means acting in opposition to said force means for selectively engaging the clutch elements.

FREDERICK E. MUNSCHAUER.

References Cited in the file of this patent

UNITED STATES PATENTS

| Number | Name | Date |
|---|---|---|
| 415,286 | Wainer | Nov. 19, 1889 |
| 2,257,006 | Hall | Sept. 23, 1941 |
| 2,420,995 | Nissen | May 20, 1947 |
| 2,428,336 | Munschauer | Sept. 30, 1947 |